United States Patent [19]

Takahashi

[11] Patent Number: 4,899,710
[45] Date of Patent: Feb. 13, 1990

[54] SYSTEM AND METHOD FOR DETECTING AND DETERMINING KNOCKING IN AN INTERNAL COMBUSTION ENGINE

[75] Inventor: Hiroshi Takahashi, Tokyo, Japan

[73] Assignee: Nissan Motor Company, Ltd., Japan

[21] Appl. No.: 247,291

[22] Filed: Sep. 22, 1988

[30] Foreign Application Priority Data

Sep. 22, 1987 [JP] Japan .................. 62-143937[U]

[51] Int. Cl.$^4$ ............................................. F02P 5/14
[52] U.S. Cl. .................................... 123/425; 123/435
[58] Field of Search ................. 123/425, 435; 73/35, 73/116, 119 R

[56] References Cited

U.S. PATENT DOCUMENTS

| 4,312,214 | 1/1982 | Kramer et al. | 73/35 |
| 4,344,400 | 8/1982 | Asano | 123/425 |
| 4,391,126 | 7/1983 | van Zanten | 73/35 |
| 4,425,891 | 1/1984 | Kashimura et al. | 73/35 X |
| 4,463,722 | 8/1984 | Kobayashi | 123/425 |
| 4,478,068 | 10/1984 | Bonitz et al. | 73/35 |
| 4,593,553 | 6/1986 | Bonitz et al. | 73/35 |

FOREIGN PATENT DOCUMENTS

53-60430 5/1978 Japan .
60-80335 6/1985 Japan .

Primary Examiner—Willis R. Wolfe
Attorney, Agent, or Firm—Lowe, Price, LeBlanc, Becker & Shur

[57] ABSTRACT

A system and method for detecting and determining knocking in an internal combustion engine in which various kinds of signals (engine vibrations, engine revolution speed, opening angle of a throttle valve, crank angle, ignition crank angle, and so on) are weighted by means of weight vectors so as to form a knocking decision signal. The knocking decision signal is compared with a reference signal so as to determine whether the knocking is occuring. The correctness or incorrectness of the determination result is determined on the basis of a highly accurate knocking detecting information provided by means of an external test device. The weight vectors are corrected in a direction in which the percentage of correct answers increases under the various engine operating conditions. The weight vectors thus corrected and learned are used to carry out highly accurate knocking detection under varying engine operating conditions. The process can be repeated as a part of normal servicing so as to compensate for the effects of aging.

14 Claims, 5 Drawing Sheets

SYSTEM AND METHOD FOR DETECTING AND DETERMINING KNOCKING IN AN INTERNAL COMBUSTION ENGINE

BACKGROUND OF THE INVENTION (1) Field of the Invention

The present invention relates generally to a system and method for detecting and determining the occurrence of a knocking in an internal combustion engine with a high accuracy thereof maintained against aging effects.

(2) Background of the art

A Japanese Patent Application First Publication (Non-Examined) Sho 53-60430 published on May 31, 1978 exemplifies a conventional knocking determining and controlling system.

In the above-identified Japanese Patent Application Publication, a knocking sensor is installed on a cylinder block (or cylinder head) of an internal combustion engine A knocking vibration detecting portion of a knocking control unit filters the output signal from the knocking sensor so as to extract a frequency component particular to the knocking occurrence (for example, several KHz). The intensity of the frequency component is determined by means of a knocking intensity determining portion. If the intensity exceeds a predetermined level, the knocking control unit deems that the knocking has occurred and a retard angle controlling portion retards the ignition timing so as to suppress the knocking.

Furthermore, a Japanese Utility Model Application Publication sho 60-80335 published on June 4, 1985 exemplifies another knocking determining and controlling system. In the Japanese Utility Model Application Publication, the output level of an integrator for integrating a particular detected and amplified frequency component of vibration in a combustion chamber of an engine cylinder is adjusted according to the engine revolution speed so as to accurately detect the occurrence of knocking.

However, in the conventional knocking controlling method, the so-called "Q" of the vibration generated by the knocking is small, "Q" being the width of the particular frequency, and when "Q" is large, the particular frequency is more clearly defined. In addition, in the conventional knocking controlling method, mechanical noise (background noise) of the engine in the detected signal of the knocking sensor cannot perfectly be eliminated. Therefore, this knocking determining method is not always accurate. Consequently, unnecessary retardation angle controls are carried out because of background noise occurring at the particular frequency peculiar to the knocking, especially when the engine revolves at a high speed in which the mechanical noises are increased.

While more accurate knocking detecting means are available, they are complex and heavy and their cost is prohibitively high and, furthermore, the detection accuracy of knocking reduces with age.

SUMMARY OF THE INVENTION

It is, therefore, an object of the present invention to provide a system and method for detecting and determining the occurrence of knocking with high accuracy.

It is another object of the present invention to provide a system and method for detecting and determining the occurrence of knocking in which the adverse effects of aging are greatly reduced.

The above-described objects can be achieved by providing a system for detecting and determining knocking in an internal combustion engine, comprising: (a) first means for detecting various engine operating conditions including engine vibrations associated with engine knocking and outputting a plurality of signals indicative of the various engine operating conditions; (b) second means for weighting various signals detected and outputted by the first means using a weight vector and for producing a knocking occurrence decision signal used to determine whether the engine is knocking; (c) third means for comparing the knocking occurrence decision signal with a reference signal so as to determine whether the knocking decision signal is accurate on the basis of the comparison result; (d) fourth means for determining whether the knocking determination carried out by means of the third means is correct on the basis of an externally provided highly-accurate knocking detection information; and (e) fifth means for correcting the weight vector of the second means on the basis of the determination result by the fourth means in a direction such that a percentage of correct answer determinations made by the fourth means can be enhanced.

The above-described objects can also be achieved by providing the steps of a method for detecting and determining knocking in an internal combustion engine, comprising the steps of: (a) detecting various engine operating conditions including engine vibrations associated with engine knocking and outputting a plurality of signals indicative of the various engine operating conditions! (b) weighting various signals detected and outputted by the step (a) using a weight vector and producing a knock occurrence decision signal used to determine whether the engine is knocking., (c) comparing the knocking occurrence decision signal with a reference signal so as to determine whether the knocking decision signal is accurate on the basis of the comparison result! (d) determining whether the knocking determination carried out by means of the third means is correct on the basis of an externally provided highly-accurate knocking detection information; and (e) correcting the weight vector of the step (b) on the basis of the determination result in the step (d) in a direction such that a percentage of correct answer determinations made in the step (d) can be enhanced.

DETAILED DESCRIPTION OF THE PREFERRED EMBODIMENT

Reference will hereinafter be made to the drawings in order to facilitate understanding of the present invention.

Figure 1:
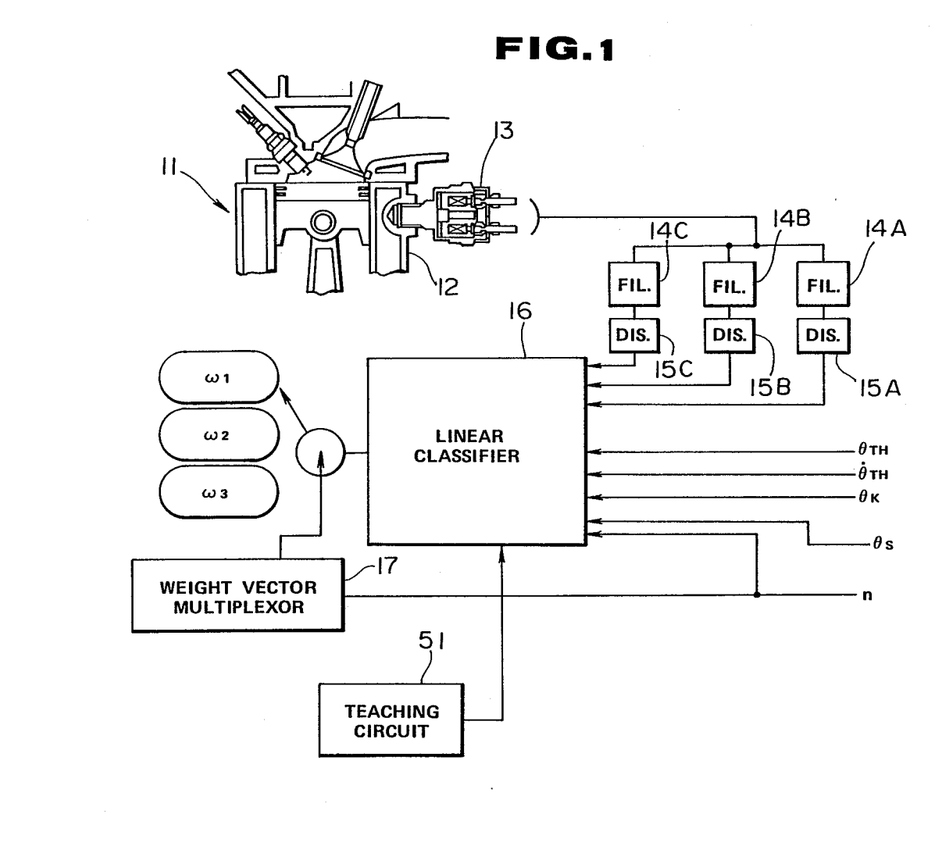
FIG. 1 is a block diagram of a system for detecting and determining the occurrence of knocking in an internal combustion engine of a preferred embodiment according to the present invention.

FIG. 1 shows the overall configuration of the preferred embodiment of a system for detecting and determining the occurrence of knocking.

A knock sensor 13 is installed on a part of the cylinder block 12 in the vicinity of a combustion chamber of an engine 11. An output signal of the knock sensor 13 is inputted to filter circuits 14A to 14C respectively for providing pass bands at selected frequency bands. The selected frequency pass bands may be, for example, 500 Hz, 2 KHz, 5 KHz, 7 KHz, 9 KHz, and so on. Thereafter, the selected frequency components are supplied to corresponding intensity determining circuits 15A to 15C constituted by integrators for respective frequencies. Output signals of the intensity determining circuits are supplied to a linear classifier 16.

An engine speed signal representing the engine speed n, an opening angle signal representing the opening angle of an engine throttle valve $\theta_{TH}$, a first-order difference $\dot{\theta}_{TH}$ of the opening angle of the throttle valve, a crank angle signal $\theta_K$. and an ignition crank angle $\theta_s$ are inputted to the linear classifier 16.

The linear classifier 16 calculates a weighted mean of the detection results of various kinds of engine operating conditions using weight vectors to determine whether the knocking is occurring as will be described later in more details and corrects and learns parameters of the weight vectors on the basis of a teaching signal to be described later.

Figure 4:
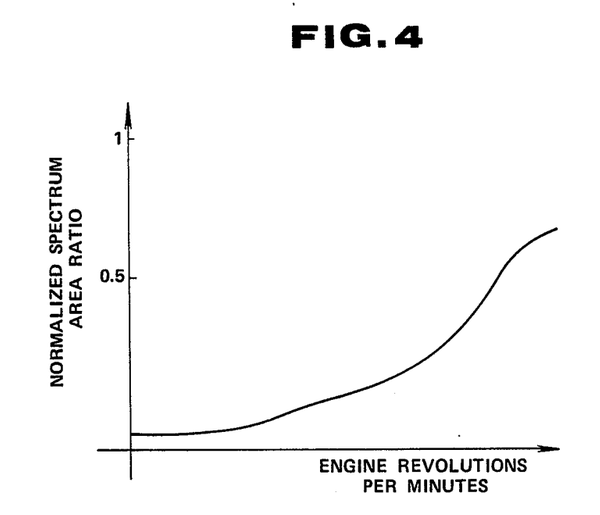
FIG. 4 is a characteristic graph of an area ratio of a frequency spectrum of engine vibrations to a whole area of frequency with respect to engine revolutions.

FIG. 4 shows the relationship between the engine speed and an area ratio of a normalized spectrum of vibrations in a frequency range from 5 KHz to 9 KHz in the cylinder block on which the knock sensor 13 is mounted.

As shown in FIG. 4, as the engine speed is increased, the mechanical noise abruptly increases in the vicinity of 5 KHz to 9 KHz.

Therefore, it is difficult at these frequency ranges to determine a parameter value of a single weight vector which can provide highly accurate knocking determination at all engine revolution rates even if correction and learning are carried out.

In the preferred embodiment, a weight vector multiplexor 17 is installed for changing the weight vector according to the rate of engine revolution.

For example, three separate weight vectors $\omega_1$, $\omega_2$, and $\omega_3$ are used in a low speed range, a middle speed range, and high speed range, respectively.

Figure 2:
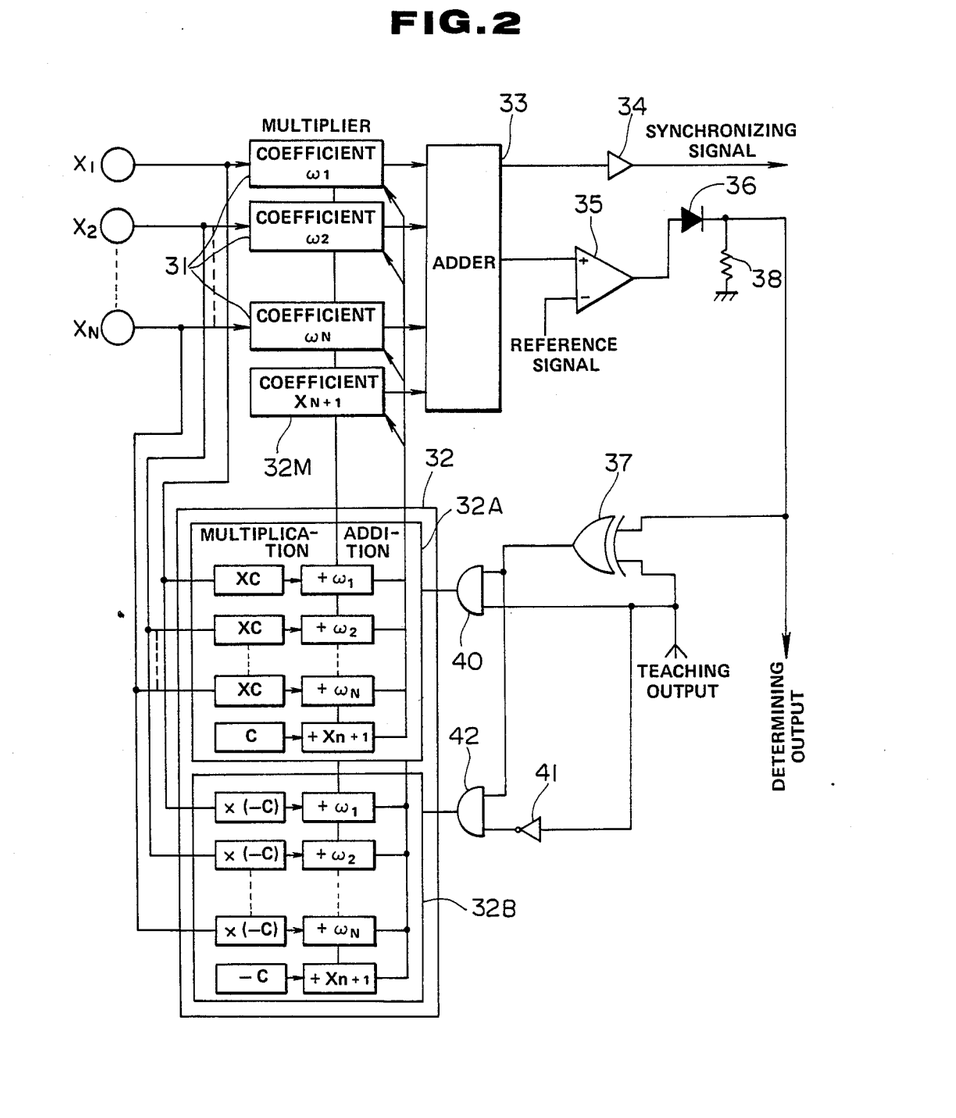
FIG. 2 is a circuit block diagram of a linear classifier of the knocking determining system shown in FIG. 1.

FIG. 2 shows the internal configuration of the linear classifier 16.

As shown in FIG. 2, the linear classifier 16 includes a plurality of multipliers 31 for multiplying input signals $x_1$ to $x_N$ corresponding to various kinds of engine operating conditions by corresponding parameters $\omega_1$ to $\omega_N$ the weight vectors and an adder 33 for adding respective values obtained by the respective multipliers 31 to a constant $x_{N+1}$ stored in a constant memory 32M.

Upon completion of the addition, the adder 33 outputs an end signal, the added output signal is supplied to a reset terminal of an integrator in the teaching circuit 51 as a synchronizing signal to be described later after a constant time has elasped via a delay circuit 34.

On the other hand, the arithmetically obtained value from the adder 33 is supplied to a non-inverting input terminal of a comparator 35 as a knocking detecting signal. The knocking detecting signal is compared with a reference signal supplied to an inverting input terminal of the comparator 35. When the level at the comparator is above the reference signal, the output signal of the comparator 35 indicates a high level H representing the occurrence of knocking. If the level of the knocking detecting signal is below the reference signal, the output signal of the comparator 35 indicates a low level L representing absence of knocking. The knocking determining signal derived from the comparator 35 is supplied to an ignition timing retard angle controlling circuit (not shown) and to one input terminal of an Exclusive-OR circuit 37.

The other input terminal of the Exclusive-OR circuit 37 receives a teaching signal from the teaching circuit 51 to be described later.

It is noted that the teaching circuit 51 is installed independently of the knocking determining system shown in FIG. 1 installed in a vehicle.

Figure 3:
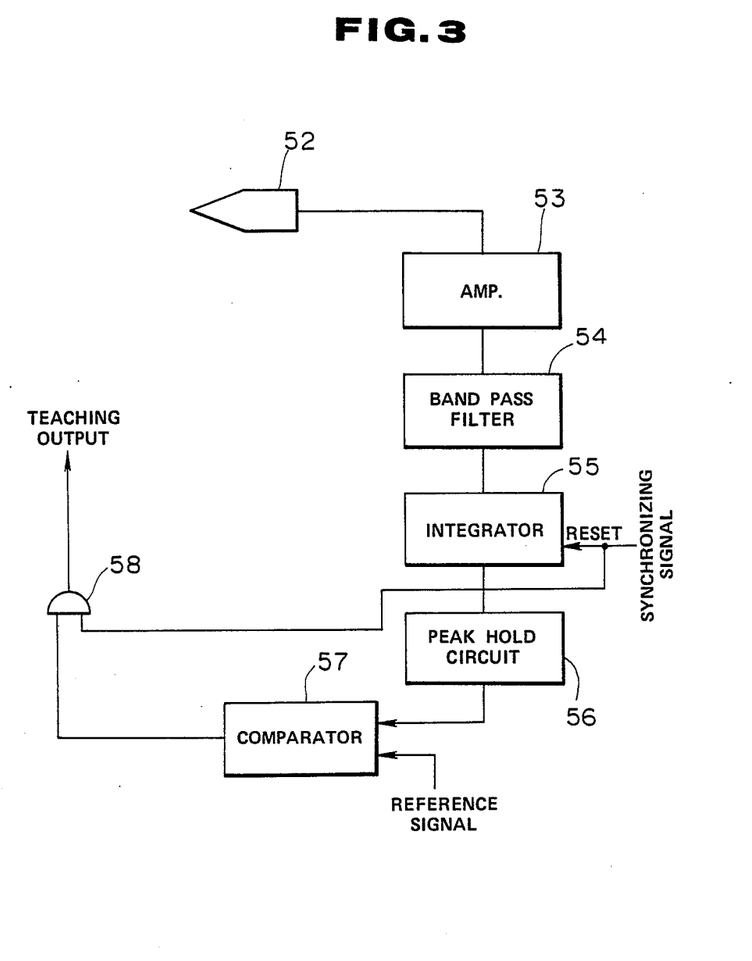
FIG. 3 is a circuit block diagram of a teaching circuit of the knocking determining system shown in FIG. 1.

The teaching circuit 51 detects the occurrence of knocking with high accuracy. When knocking is occurring, the circuit 51 outputs the high level signal H and outputs the low level signal L when knocking is absent.

The Exclusive-OR circuit 37 outputs the low L level signal when both the knocking detecting signal derived from the comparator 36 via an diode 36 and the knocking detection signal derived from the teaching circuit 51 are low levels L. However, the Exclusive-OR circuit 37 outputs the high H level signal when the two kinds of input signal levels are different. This signal is inputted to a weight vector corrector 32.

In other words, if the knocking detecting signal coincides with the detection result of the teaching circuit 51, the Exclusive-OR circuit 37 outputs the low level output L since the determination of the presence of knocking is correct. If they do not coincide with each other, the high level signal H is outputted.

The output signal of the Exclusive-OR circuit 37 is supplied to one input terminal of a first AND circuit 40, the other input terminal of the first AND circuit 40 receiving the output signal of the teaching circuit 51. In addition, the output signal of the teaching circuit 51 is supplied to one input terminal of a second AND circuit 42 via an inverter 41, the other input terminal thereof receiving the output signal of the Exclusive OR circuit 37.

The output signal of the first AND circuit 40 is supplied to a first arithmetic operation portion 32A of the weight vector corrector 32 as a trigger signal.

The output signal of the second AND circuit 42 is supplied to a second arithmetic operation portion 32B of the weight vector corrector 32 as a trigger signal.

The first arithmetic operation portion 32A carries out the correction and updating of each present parameter $\omega_1$ to $\omega_N$ of the multipliers 31 using addition values of each present parameter $\omega_1$ to $\omega_N$ inputted from respective multipliers 31 to values of the respectively corresponding input signals $x_1$ to $x_N$ multiplied by a predetermined positive constant C when the output signal level of the first AND circuit 40 indicates the high level H, i.e., when the knocking detecting signal indicates no occurrence of knocking in spite of the indication of the presence of knocking in the teaching circuit 51. Furthermore, the constant $x_{N+1}$ stored in the memory 32M is corrected and updated by the addition value of the constant $x_{N+1}$ inputted from the memory 32M and the positive constant C ($x_{N+1}+C \rightarrow x_{N+1}$).

On the other hand, the second arithmetic operation portion 32B carries out the correction and updating of each parameter $\omega_1$ to $\omega_N$ of the multipliers 31 using a subtraction value of the respectively corresponding input signals $x_1$ to $x_N$ multiplied by the constant C from each present parameter $\omega_1$ to $\omega_N$ inputted from each multiplier 31 when the second AND circuit 42 outputs the high level signal H, i.e., when the knocking detecting signal indicates the presence of knocking in spite of the indication of no knocking of the output signal derived from the teaching circuit 51. In addition, the constant $x_{N+1}$ in the memory 32M is corrected and updated by subtraction of the constant C.

It is noted that the multipliers 31 and memory 32M store parameters corresponding to the three kinds of weight vectors $\omega_1$, $\omega_2$, and $\omega_3$ for the low speed range, middle speed range, and high speed range of the engine revolutional speed N. The weight vector multiplexor 17 changes the corresponding parameters according to the weight vectors $\omega_1$, $\omega_2$, $\omega_3$ during the correction and updating of the parameters and during all subsequent knocking detection.

FIG. 3 shows a specific example of the teaching circuit 51.

Since the teaching circuit 51 determines the correctness or incorrectness of the knocking detection in the knocking detection system mounted in the vehicle, knocking can be detected with high accuracy.

The signal derived from a high sensitivity knock sensor 52 which detects engine vibrations is amplified by means of an amplifier 53. Thereafter, a band-pass filter 54 passes frequency component which falls in the range from 7 KHz to 13 KHz. The thus obtained frequency component is integrated by means of an integrator 55 whenever the synchronizing signal is inputted from the linear classifier 16 which is mounted in the vehicle. A peak hold circuit 56 holds the maximum value obtained by the integration and supplies the maximum value to an input terminal of a comparator 57. The other input terminal of the comparator 57 receives a reference signal corresponding to a lower limit value. When the maximum value exceeds the reference signal level, the comparator 57 outputs the high level signal H indicating the occurrence of knocking.

The output signal of the comparator 57 is supplied to one input terminal of an AND circuit 58. The other input terminal of the AND circuit 58 receives the synchronizing signal.

When the comparator 57 determines that the knocking is present at each occurrence of the synchronizing signal, the AND circuit 58 outputs the high level H signal. When the comparator 57 determines that there is no knocking the AND circuit 53 outputs the low L signal.

The teaching signal derived from the AND circuit 53 causes the correction and learning of the weight vectors in the linear classifier 16 in the vehicle.

It should be noted that since the above-described detection of knocking is carried out only on the basis of a frequency analysis of the vibration frequency, the results thus obtained often differ from those obtained through an unaided human perception and, therefor, in cases where it is deemed to suppress the perceptible knocking, the signal of the teaching circuit 51 is appropriately adjusted.

A highly accurate internal cylinder pressure sensor (used for the experiments) may alternatively be used in place of the knock sensor in the teaching circuit. An example of the highly accurate cylinder pressure sensor is exemplified by a U.S. Pat. No. 4,324,625, the disclosure of which is hereby incorporated by reference.

Next, a series of control operations will be described below.

The vibration frequencies detected by the knock intensity detecting circuits 15A to 13 C and the other detected information activate the linear classifier 16 to form the knocking detecting signal. However, since the optimum value of the weight vector in the linear classifier 13 is indefinite at an initial stage, the knocking determination is carried out with an appropriate initial value provided for the linear classifier The teaching circuit 53 is used to determine the correctness or incorrectness of knocking detection taught externally of each knocking detection. Such a trial and error process as described above is repeated to optimize the weight vector.

The operation of the binary determining type linear classifier using a threshold value logic operator will be described below.

Figure 5:
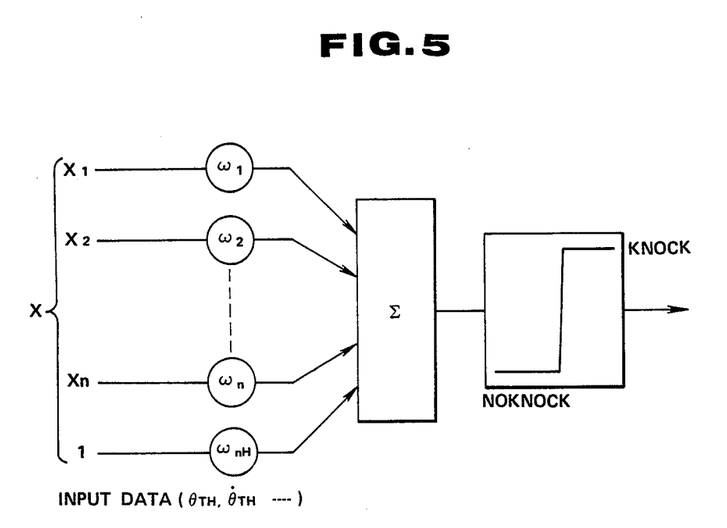
FIG. 5 is a schematic block diagram for explaining an operation of the linear classifier.

As shown in FIG. 5, two categories can be divided according to linear equations on the basis of the combinations of the input rows $x_i$ ($i=1, 2, ---, N$).

For example, the equation $y = 5x_1 - 2x_2$ is employed as a linear equation.

If the value of y is positive, it is deemed that there is knocking (the determination of category A is made). If the value of x is negative, it is deemed that there is no knocking (the determination of category B is made).

At this time, if $x_1 = 5$ and $x_2 = -4$, then $y = 33$ and therefore y is positive (if the input row ($x1, x2$) = (5, $-4$), then $y = 33$ from the equation and therefore the input row (5, $-4$)) and is determined to be in the category A (deemed that there is no knocking).

Suppose that the coefficient to the input in the equation is indefinite. Since the coefficient is indefinite, the coefficient is arbitarily determined so that the value of y is calculated first. The determination of category (knocking or no knocking) is made according to the value of y derived from the arbitary coefficient. It is therefore natural that there will be cases where the correct determination is carried out and where the incorrect determination is carried out.

At this time, this system can check whether its determination is correct or incorrect. Even if one of the factors is determined arbitrarily initially through subsequent trial and error operations a precise value can be obtained. Therefore, the indefinite coefficient is determined through the learning from the taught determination of correctness and incorrectness and input row.

The above-described learning process is applied to the preferred embodiment.

The input row $x_i$ corresponds to the intensity $If_i$ ($i=1, 2, 3$) of each vibration frequency derived by the intensity determining circuits 15A to 15C, the engine speed, opening angle $\theta_{TH}$. first order difference $\dot{\theta}_{TH}$ of the opening angle of the throttle valve, crank angle $\theta_K$, and ignition angle $\theta_S$ derived by the signals from various sensors and control unit.

In addition, the weight vectors $\omega_1$, $\omega_2$, $\omega_3$---, $\omega_N$ are parameters (weights) corresponding to the various types of input information $x_1, x_2, x_3, ---x_N$.

Let now us assume that the parameter group of the equation at the time k is to be derived times is $\omega_{ik}$. The equation is expressed as $y_k = \omega_{1k}x_1 + \omega_{2k}x_1 + \cdots + \omega_{Nk}x_N$.

This value is derived by the adder 33 and is compared with the reference value $\delta$ for deriving the knocking detection signal be inputted to the comparator 35. If $y_k > \delta$, it is deemed that there is knocking. If $y_k < \delta$, it is deemed that there is no knocking.

The result is compared with the teaching signal. If both signals coincide with each other, i.e., the determination of the presence of knocking is correct, the value of $\omega_{ik}$ is not changed. That is to say, the weight vector corrector 32 is not activated and the correction of the weight vector is not carried out.

On the other hand, although when $y_k < \delta$, it is deemed that there is no knocking if the teaching signal indicates the occurrence of knocking. At this time, it is deemed that the determination of the absence of knocking is erroneous. At this time, $\omega_{K+1} = \omega_K + Cx'_K$.

$x'_K$ denotes a matrix element $N+1$ in which 1 is added to the last item of the input row vectors $x_i$. C denotes an arbitrary positive number governing a convergence state of learning.

Since, in this case, each parameter $\omega_i$ is incremented by $Cx_i$, the value of $y_K$ is incremented so as to correct the weight vector in the direction in which the correct determination of the presence of knocking can be derived.

Since each parameter $\omega_i$ is incremented by a value proportional to the input detection value $x_i$, the parameter $\omega$ under the operating condition in which the degree to which the knocking occurs is large has a large correction quantity and under the engine operating condition in which the degree to which the knocking occurs has a small correction quantity. Hence, the correction is carried out in the direction in which the percentage of correct answers for each parameter is increased.

In addition, when $y_K < \delta$, the presence of knocking is determined and the teaching signal indicates no occurrence of knocking, the determination that the knocking is present is deemed erroneous.

At this time, $\omega_{K+1} = \omega_K - Cx'_k$.

In this case, hence, the value of the parameter under the operating condition in which the rate at which no knocking occurs is associated is large has a large correction quantity. The correction is carried out in a direction toward which the percentage of correct answers that the knocking is absent is increased for each parameter.

As the correction and learning are repeated, the percentages of the correct answers of occurrence of knocking increase so as to approach the values of parameter at which the favorable determination results can be achieved.

Figure 6:
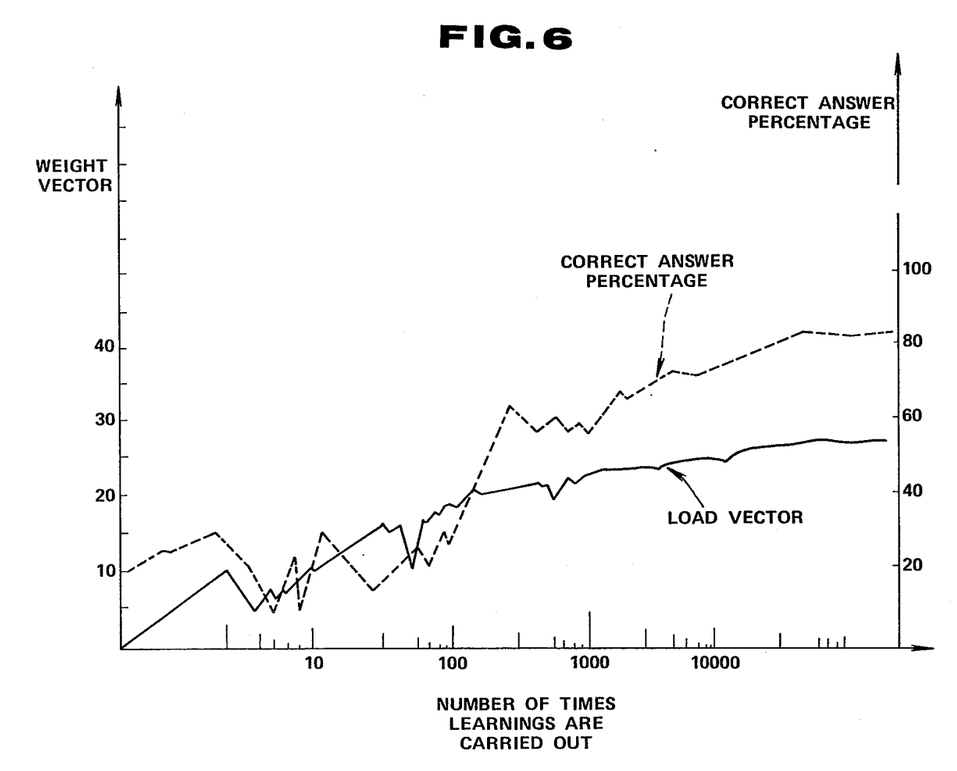
FIG. 6 is a characteristic graph showing a load vector and the correct answer percentage of the knocking determinations with respect to the number of times the load vectors are corrected.

FIG. 6 shows a relationship between the number of times the learning is carried out and both the weight vector value and correct answer percentage.

As shown in FIG. 6, as the number of times the learning is carried out, the correct answer percentage is increased. In this way, when the correct answer percentage exceeds a predetermined value, the learning is ended and a programming of an on-board knocking detecting system is completed.

In the preferred embodiment, the engine operating conditions to be considered the engine vibrations detected by the knock sensor include the engine rotational speed, opening angle of the throttle valve, its first-order difference, crank angle, and ignition crank angle. Since these engine operating parameters largely affect the knocking and the degree of influence on the occurrence of knocking is established under different engine operating conditions, the accuracy of knocking determination can be enhanced for every type of knocking. Hence, the accuracy of knocking determination can be greatly improved with an inexpensive construction and the more expensive highly accurate knocking detecting system used in the teaching circuit need not be mounted in the vehicle.

In addition, the highly accurate knocking determinations may be achieved with the above-described learning processes carried out during shipment. Furthermore, even if the accuracy of knocking detection circuit due to the aging effect, the above-described learning process can be carried out during the inspection so that the highly accurate knocking determination can be regained without replacement of parts.

As described hereinabove, since in the system and method for determining the occurrence of knocking according to the present invention the degree of influence of various kinds of engine operating parameters including the engine vibrations on the occurrence of knocking is learned on the basis of the highly accurate knocking detecting information received from a test equipment and the determination whether the engine knocking occurs is carried out on the basis of the learned value, the knocking which occurs under various kinds of conditions can be determined with the high accuracy. Furthermore, the process can be repeated when the vehicle is serviced so as to compensate for aging.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for detecting and determining knocking in an internal combustion engine, comprising:
    (a) first means for detecting various engine operating conditions including engine vibrations associated with engine knocking and outputting a plurality of signals indicative of the various engine operating conditions;
    (b) second means for weighting various signals detected and outputted by the first means using a weight vector and for producing a knocking occurrence decision signal used to determine whether the engine is knocking;
    (c) third means for comparing the knocking occurrence decision signal with a reference signal so as to determine whether the knocking decision signal is accurate on the basis of the comparison result;
    (d) fourth means for determining whether the knocking determination carried out by means of the third means is correct on the basis of an externally provided highly-accurate knocking detection information; and
    (e) fifth means for correcting the weight vector of the second means on the basis of the determination result by the fourth means in a direction such that a percentage of correct answer determinations made by the fourth means can be enhanced.

2. The system as set forth in claim 1, wherein the first means includes sixth means for detecting an engine revolution speed and wherein the second means includes seventh means for changing the weight vector according to the engine revolution speed detected by the sixth means.

3. The system as set forth in claim 2, wherein the second means includes a linear classifier having a plurality of multipliers multiplying parameters $\omega_1$ to $\omega_N$ of the weight vector respectively corresponding input signals $x_1$ to $x_N$ derived from the first means and an adder for inputting and adding each value of the multipliers indicative of the corresponding input signal derived by the first means multiplied by the corresponding parameter of the weight vector.

4. The system as set forth in claim 3, wherein the adder outputs an end signal upon completion of the addition calculation and outputs a synchronization signal.

5. The system as set forth in claim 4, wherein the fourth means includes a teaching circuit including a knock sensor for detecting the engine vibrations; an amplifier for amplifying the output signal derived by the knock sensor; a band pass filter passing a particular frequency band in which knocking can be detected from the amplified output signal; an integrator for integrating the knocking component whenever the synchronization signal is inputted from the adder; and a peak hold circuit for holding a maximum value in the peak hold circuit, the maximum value being inputted to one input terminal of a comparator, the other input terminal of the comparator receiving a reference signal corresponding to a lower limit value of the knocking occurrence.

6. The system as set forth in claim 1, wherein the fifth means corrects the weight vector when the fourth means determines that the knocking detection is incorrect.

7. The system as set forth in claim 6, the fifth means corrects the value of each weight vector parameter in the direction such that each value of the parameters of the weight vector is increased when the fourth means determines that the knocking detection is incorrect and when the highly-accurate external knocking information indicates that the knocking occurs.

8. The system as set forth in claim 7, wherein the fifth means corrects the weight vector parameter in the direction in which each value of the parameters of the weight vector is decreased, when the fourth means determines that the knocking detection information is incorrect and the highly-accurate external knocking information indicates that the knocking does not occur.

9. The system as set forth in claim 7, wherein the fifth means corrects each weight vector parameter in accordance with the formula: $\omega_{K+1} = \omega_K + CxX'_K$, wherein C denotes an arbitrary positive number and $X'_K$ denotes a vector of (N+1) element of an input signal row vector constituted by the signals derived by the first means to which 1 is added.

10. The system as set forth in claim 8, wherein the fifth means corrects each weight vector parameter in accordance with the formula: $\omega_{K+1} = \omega_K - CxX'_K$, wherein C denotes an arbitrary positive number and $X'_K$ denotes a vector of (N+1) element of an input signal row vector constituted by the signals derived by the first means to which 1 is added.

11. The system as set forth in claim 2, wherein the first means includes eighth means for detecting an opening angle of an engine throttle valve and outputting the signal indicative thereof, ninth means for deriving a first order difference of the throttle valve, tenth means for deriving engine crankshaft rotations and outputting the signal indicative thereof, and eleventh means for deriving engine crankshaft rotations used for ignitions and outputting the signal indicative thereof.

12. The system as set forth in claim 1, which further comprises sixth means for comparing the percentage of correct answer determinations with a predetermined value of percentage and outputting a signal when the percentage of correct answer determinations exceeds the predetermined value, so that when the signal is outputted from the sixth means, the system is actually applied to the internal combustion engine as an on-board system.

13. The system as set forth in claim 12, which further comprises seventh means responsive to the output signal from the third means for controlling an ignition timing depending on the result of the comparison by the third means, the seventh means being connected to the third means when the output signal is derived by the sixth means.

14. A method for detecting and determining knocking in an internal combustion engine, comprising the steps of:
(a) detecting various engine operating conditions including engine vibrations associated with engine knocking and outputting a plurality of signals indicative of the various engine operating conditions;
(b) weighting various signals detected and outputted by the step (a) using a weight vector and producing a knock occurrence decision signal used to determine whether the engine is knocking;
(c) comparing the knocking occurrence decision signal with a reference signal so as to determine whether the knocking decision signal is accurate on the basis of the comparison result;
(d) determining whether the knocking determination carried out by means of the third means is correct on the basis of an externally provided highly-accurate knocking detection information; and
(e) correcting the weight vector of the step (b) on the basis of the determination result in the step (d) in a direction such that a percentage of correct answer determinations made in the step (d) can be enhanced.

* * * * *